Sept. 28, 1948.　　　　G. W. JACKSON　　　　2,450,282
ANTIFRICTION SCREW AND NUT ACTUATOR
Filed July 18, 1946　　　　　　　　　　　　2 Sheets-Sheet 1

INVENTOR
GEORGE W. JACKSON
BY
HIS ATTORNEYS.

Sept. 28, 1948. G. W. JACKSON 2,450,282
ANTIFRICTION SCREW AND NUT ACTUATOR
Filed July 18, 1946 2 Sheets-Sheet 2
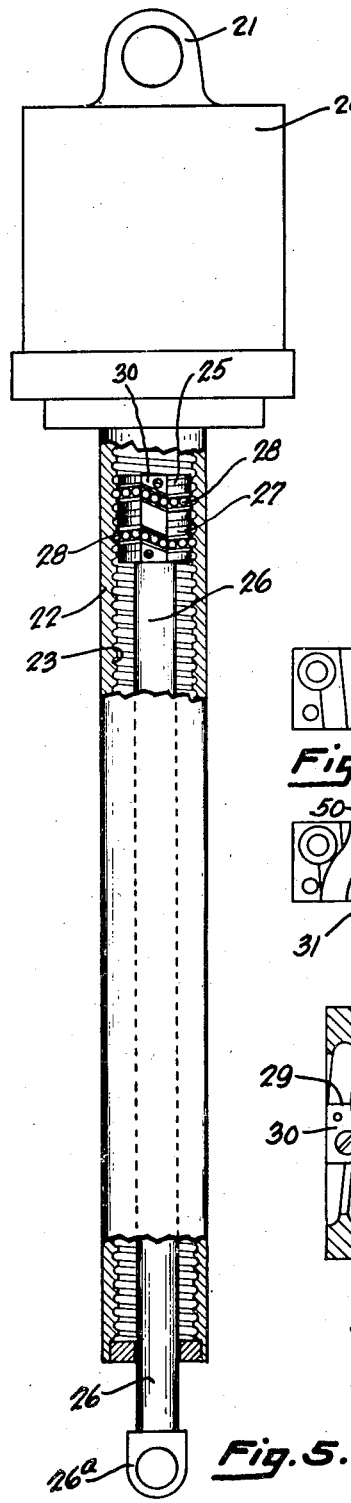
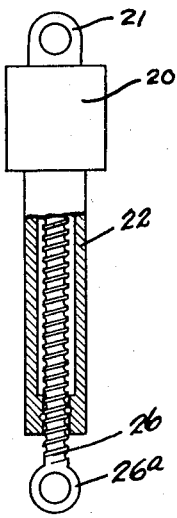
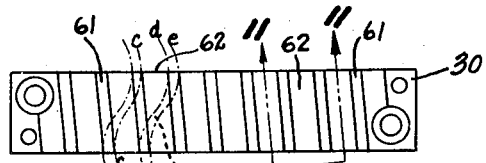
INVENTOR
GEORGE W. JACKSON
BY Spencer, Hardman and Feke
HIS ATTORNEYS.

Patented Sept. 28, 1948

2,450,282

UNITED STATES PATENT OFFICE 2,450,282

ANTIFRICTION SCREW AND NUT ACTUATOR

George W. Jackson, Dayton, Ohio, assignor to General Motors Corporation, Detroit, Mich., a corporation of Delaware Application July 18, 1946, Serial No. 684,588

13 Claims. (Cl. 74—459)

This invention relates to improvements in load moving devices such as jacks or the like and which are adapted to exert a pushing or pulling effort as the device is extended or retracted.

It is among the objects of the present invention to provide a unitary, power driven load moving device of compact and sturdy construction in which friction between the relatively movable parts, particularly the extensible parts which move the load, is reduced to a minimum.

This object is accomplished by providing the two relatively movable members, the one driven by the power unit the other having the load secured thereto, with helical grooves of similar pitch and placing ball bearings in the channel formed by said coinciding grooves which ball bearings mechanically connect the two members so that rotation of one causes the other to move longitudinally thereon.

A further object of the present invention is to provide the one relatively movable member of the load moving device with one or more single turn grooves or furrows each groove or furrow comprising a helical portion and an angular portion of a pitch reverse to the pitch of the helical portion and of greater depth, whereby the ball bearings are confined to the single turn during the entire range of movement of the one member longitudinally of the other.

A still further object of the present invention is to prevent the ball bearings from wedging or jamming during the operation of the device.

This and the preceding object is accomplished by providing barrier extensions on each side of the reverse pitch, angular portion of each single turn groove, which extension is shaped and positioned to enter and pass through the multi-turn groove in the cooperating member, thereby guiding the ball bearings as they pass from the one helical portion of the single turn groove, through the reverse pitch, cross over portion into the helical portion again, whereby the ball bearings are maintained in the single turn groove and prevented from entering and wedging into adjacent portions of the multi-turn helical groove of the cooperating member.

Another object of the present invention is to produce a member having one or more single turns, closed circuit grooves, or furrows each consisting of a helical portion of a certain pitch and a cross over, connecting portion of reverse but similar angular pitch and greater depth, at a minimum cost of time and in a simple, yet precise manner.

This object is accomplished by providing at least one complete helical groove in the peripheral surface of a member, then cutting a longitudinal slot in said member so that the helical groove is intersected, then securing an insert in said slot, said insert having a groove or furrow open at its ends and top and of greater depth than the helical groove but of a reverse yet similar angular pitch so that the two ends of the helical groove or furrow are connected by said reverse pitch groove or furrow and thereby providing a closed circuit, single turn groove.

Further objects and advantages of the present invention will be apparent from the following description, reference being had to the accompanying drawings, wherein a preferred embodiment of the invention is clearly shown.

In the drawings:

Fig. 1 is a perspective view showing portions of the two relatively movable members of the device, one being exteriorly grooved, the other interiorly. The insert in the one member, with its reverse pitch groove or furrow portions and adjacent barrier extensions, is clearly illustrated.

Fig. 2 is a part sectional view of the elements shown in Fig. 1. The interiorly grooved, surrounding member is shown in section while the exteriorly grooved shaft member is viewed, directly down upon its insert. Ball bearings are shown in the channels formed by the coinciding grooves of the two members.

Fig. 5 is a schematic showing of one form of load moving device having the present invention applied thereto.

Fig. 6 is a similar view, at reduced scale, of another form of load moving device.

Fig. 7 is like Fig. 6 and shows still another type of load moving device.

Figure 1:
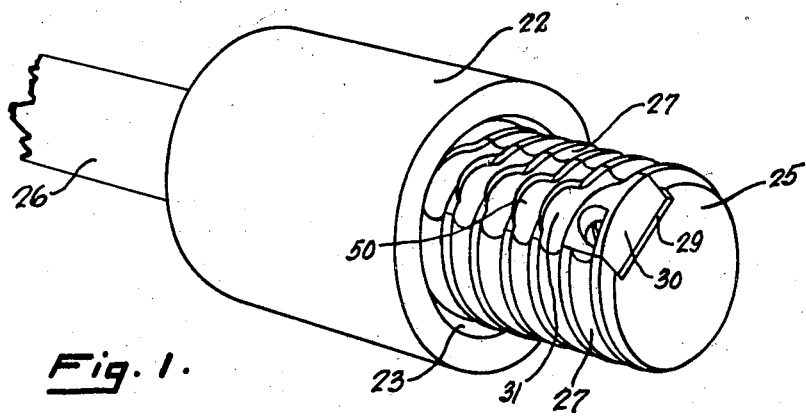

Figs. 8 to 13, inclusive, detailedly illustrate the insert securable in the longitudinal slot of the one member, for connecting the ends of the several helical turns to make each a closed circuit, single turn groove. Fig. 8 is a top plan view of the insert after one stage of operation has been completed.

Fig. 9 is a similar view showing the insert after its second operation and in completed form.

Fig. 10 is an end view of the insert.

Fig. 11 is a side view taken within the area and direction of line and arrows 11—11 of Fig. 8.

Fig. 12 is a cross section taken along the line 12—12 of Fig. 9.

Fig. 13 is a cross section taken along the line 13—13 of Fig. 9, and,

Fig. 14 is a fragmentary detail view of the insert arrangement when placed in the interiorly grooved member as shown in Fig. 7.

As mentioned heretofore, the load moving device of the present invention is preferably power driven. The present drawings show the prime mover to be an electric motor. This motor may be of any standard type consisting of a stator and a rotor housed in any suitable frame or housing. In the Fig. 5 of the drawings the frame, housing the motor, is designated by the numeral 20. This frame has an attachment lug 21. Any suitable speed reducing gearing (not shown) is also contained within the housing or frame 20 said gearing being driven by the rotor of the electric motor. A tubular shaft 22 extends into the housing 20 and has a bearing therein, said shaft 22 being operatively connected to the speed reducing gearing so that the motor may turn the shaft at a predetermined speed. The interior surface of the tubular shaft 22 has a multi-turn, helical groove 23 provided therein substantially throughout the entire length of the shaft. The groove is of predetermined size and as shown in the present drawings is substantially semi-circular in cross section.

Fig. 5 shows a plug 25 fitting in the tubular shaft 22 so as to be slidable therein. Plug 25 has a rod or shaft 26 secured thereto or formed integral therewith, said rod 26 extending beyond the confines of the tubular shaft 22 when the plug 25 is in its innermost position within said tubular shaft. Rod 26 has an anchor element 26a to which the load or any suitable load moving leverage may be secured. These maintain the rod 26 and its plug 25 against rotation but provide for their longitudinal movement relatively to the tubular shaft 22.

The plug 25 has a helical groove or furrow 27 in its outer peripheral surface complementary to the groove in the tubular shaft 22 to form a helical passage of substantially semi-circular cross-section in which ball bearings 28 are provided which mechanically connect the shaft 22 and plug 25 so that rotation of the former causes the latter to move longitudinally relatively to said shaft.

To prevent the ball bearings 28 from being ejected from the passage between the shaft and plug while said plug is moving longitudinally relatively to the tubular shaft, it is necessary that said bearings move through a closed-circuit passage including the greater portion of at least one turn of a helical groove in one of the members. In the form of construction shown in Fig. 5, this single turn, closed path is provided in the plug 25. As illustrated this single turn comprises the greater portion of one helical turn connected by an angular cross over passage of reverse pitch. This closed path, single turn groove may entirely be formed in the peripheral surface of the plug by machining which is a tedious, complicated and time consuming operation requiring special machine and tool equipment and especially if the plug is to include the feature of this invention which will be defined detailedly hereinafter. However, a simpler way of providing closed, single turn grooves in plug 25 forms the subject matter of the present invention and includes the provision of a continuous multi-turn helical groove 27 in the outer peripheral surface of the plug 25. This groove or at least a portion thereof must be complementary to the helical groove 23 in the tubular shaft 22. A longitudinal slot 29 is provided in the outer surface of plug 25, said slot intersecting all of the turns of the helical groove 27 therein so that said groove, instead of being continuous, now consists of a plurality of interrupted, helically profiled furrows each terminating in said longitudinal slot. An insert plate 30 is secured in the slot 29 by screws or any other suitable means, said insert having one or more angular grooves or furrows 31 of a pitch reverse to the pitch of the helical grooves but spaced so that each angular groove of the insert connects two oppositely disposed ends of a helical groove in the plug. This completes this particular groove and renders it a closed circuit, a greater portion of which has a helical profile and the remaining portion being angular and of a pitch reverse to the pitch of the helical portion.

The angular furrows or grooves 31 of the insert plate 30 are at least one and one half times as deep as the depth of the helical groove 27. This permits the ball bearings 28, rolling through said cross passage groove 31, to pass beneath the face of the tubular shaft 22 between its groove 23, which face passes over the cross groove 31.

Fig. 5 illustrates a load moving device in which the prime mover or electric motor rotates the tubular shaft 22 and the load is secured to and moved by the rod 26 and its plug 25. Fig. 6 illustrates an alternate construction. Here the rod and plugs 26 and 25 respectively are rotated by the prime mover within the housing 20 and the tubular shaft 22 carries and moves the load. Fig. 7 shows still another form of construction. Like in Fig. 6, the prime mover rotates the tubular shaft 22 and the rod 26 carries and moves the load, however, in Fig. 6, the tubular shaft 22 has the single turn groove or grooves in only a portion of its interior peripheral surface while the rod has a multi-turn continuous helical groove extending substantially throughout its entire length.

The Fig. 14 shows the insert 30 secured in the longitudinal groove 29 in tubular shaft 22, said insert providing the reverse pitch connecting cross grooves 31 which align with the ends of helical grooves 23 in said tubular shaft 22.

Any desired number of such single turn grooves may be provided to accommodate the particular use to which the load lifting device is put. Fig. 5 shows the plug provided with two single turn grooves. Fig. 6 shows only one in the plug and Fig. 14, a detail of the device shown in Fig. 7 shows two single turn grooves in the tubular shaft. In the Figs. 1, 2 and 4, a plurality of contiguous, single path grooves are shown in the plug member.

Figures 2, 3:
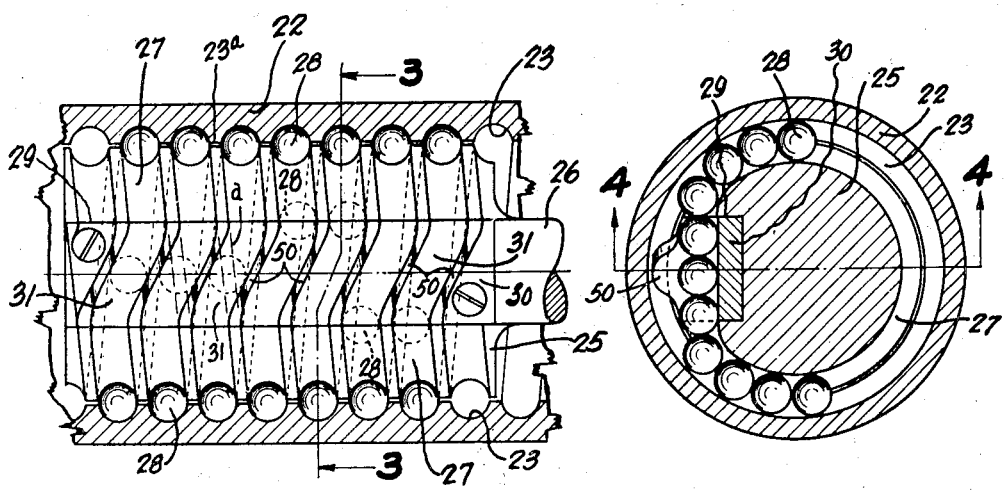
Fig. 3 is a cross sectional view taken along the line 3—3 of Fig. 2. For sake of clarity some of the ball bearings have been omitted.

Referring to these Figs. 1 to 4 inclusive, the plug 25 is shown having seven contiguous single turns, closed circuit grooves each comprising a helical profiled, greater portion 23 and a reverse pitch cross over portion 31 which is formed in the insert plate 30, secured in the longitudinal slot 29 in plug 25. Fig. 1 shows only a portion of the tubular shaft 22. In Fig. 2 the ball bearings 28 are shown in full along both sides and the dotted circles in the grooves show the ball bearings in various positions along their path of travel in the respective single turn grooves 27—31.

Figure 4:
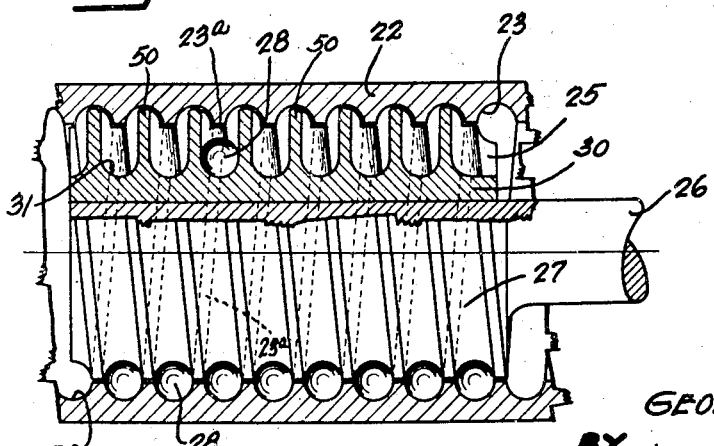
Fig. 4 is a part sectional view taken along the line 4—4 of Fig. 3. A part of the inner shaft member is shown in elevation.

The sectional view Fig. 4 clearly indicates how the inner face portion 23a of the grooved tubular shaft passes over the reverse pitch cross over groove portion 31 in the plug 25. The long dash lines (d) have been placed in Fig. 2 to indicate the angle of this surface 23a as it passes over the cross over groove 31. This necessitates a greater depth of the cross over passages 31 than the depth of the helical portion 27 of the single turn groove so that the bearings 28 may pass beneath and clear surfaces 23a as they roll from one end of the helical portion 27 of the single turn groove, through the cross over groove to the other end of the helical portion. Fig. 4 shows a ball bearing 28 passing under surface 23a.

The inner surface 23a of the tubular shaft 22, between adjacent convolutions of the helical groove 23 in said shaft, passing angularly over the reverse pitch, cross-over grooves 31 in the insert 30 forms wedge-shaped spaces into which the ball bearings 28 may be forced as the tubular shaft is rotated relatively to the plug 25 and the ball bearings are consequently rolled through the respective single turn grooves 27—31. This wedges the ball bearing into said wedge-shaped space and causes jamming and a complete stoppage of the circulation of all of the balls in said particular single-turn groove. Under these circumstances considerable damage may result and the device rendered inoperative.

As has been stated, it is among the objects of the present invention to provide means for preventing such wedging and jamming of the ball bearings. This object is accomplished by providing extensions on the insert 30 which are shaped and positioned as to enter into and move through the multi-turn groove 23 in the tubular shaft 22, said extensions forming barriers which substantially fill said groove 23 adjacent the cross over groove 31 and thus eliminate the wedge shaped space into which the ball bearing may enter and cause jamming. These extensions are in the form of a substantially semi-circular hump 50 extending from the insert plate 30 at each side of a reverse pitch, cross-over groove 31 therein. As shown in Fig. 2, the sides of said humps align with the angular cross-over grooves 31, while the edges of the humps are at an angle to coincide with the edges of the multi-turn groove in the tubular shaft 22.

Another novel feature of the present invention is the manner in which the insert plate 30 or at least the master die for commercially manufacturing the insert plate in large numbers is produced. Figs. 8 to 13, inclusive, detailedly illustrate the insert plate. First a rectangular piece of material, preferably steel, of predetermined length, width and thickness has its one side 60 arcuated to correspond to the circumference of the member, plug or tubular shaft upon which it is to be attached. When used on a plug 25 this arcuated side of the insert is convex and when used in the tubular shaft, as shown in Fig. 14, the arcuated side is concave. This particular description is directed to an insert for plug 25. The arcuated side 60 is then grooved transversely as shown in Fig. 8. The grooves, indicated by the numeral 61 are spaced, one from the other, equal to the spacing of surfaces 23a of the particular tubular shaft 22 with which the plug is to be used. These grooves 61 are of a pitch reverse to the pitch of the multi-turn groove in the tubular member or the helical groove in the plug. They are also cut to follow the contour of the side of the plate in which they are cut, so that the bottom of said grooves 61 may be said to be convex also. The rib portions 62 between the grooves 61 are rounded as shown in the detail Fig. 11. The next operation is the profiling of the final cross-grooves in the insert plate. The dot and dash lines in Fig. 8 indicate the lines of profiling cuts taken in the insert plate to form the final grooves and the humps 50. The profile cut is taken along the lines c—c and d—d so that the groove is defined by said lines. Transversely of the cut, the bottom is rounded but transversely of the insert plate or end to end of the cut it is straight. The depth of this profile cut is such that at its beginning it eliminates the adjacent end of the rib 62 in which the cut is made, specifically the space between lines c and d, then terminates at the opposite side of the insert plate 30, eliminating the end of the next rib 62 adjacent to the rib whose end was eliminated at the beginning of the cut. The next profile cut whose one edge is represented by the dot and dash line e—e, will permit the intervening portion of the rib to remain intact, thereby forming the cross-over groove edge having the extending hump portion 50 whose rounded edge, adapted to enter and move through the multi-turn groove 23 of the tubular shaft 22, is the rounded edge of the rib 62. The two sides of the reverse pitch, cross over groove 31 is formed by the profile cut and the edges of the hump 50, coinciding with the angle of the surface 23a of the grooves 23 in the tubular shaft 22 is formed by the cutting of the grooves 61 during the first operation.

The insert plate 31 used in the tubular shaft 22 instead of plug 25, and as particularly shown in Fig. 14 may be made in a similar manner, however, in this case certain portions are made concave instead of convex in order to accommodate for the reversed installation and use.

From the foregoing description it may be seen that the present invention contemplates the provision of a simple, compact and sturdy mechanism for connecting together two members, one rotatable the other longitudinally movable in response to rotation of said one member, said mechanism reducing friction to a minimum and substantially eliminating the possibility of damage due to the jamming of the ball bearings used in the mechanism. The invention also contemplates a novel and time and labor saving method of producing means to accomplish the features set forth.

While the embodiment of the present invention as herein disclosed, constitutes a preferred form, it is to be understood that other forms might be adopted, all coming within the scope of the claims which follow.

What is claimed is as follows:

1. A load moving device comprising in combination two members rotatable and longitudinally movable relatively to each other, one member surrounding the other; means for rotating one of said members; cooperating formations on both members for enabling rotation of the rotatable member to cause the other member to move longitudinally relatively to the rotated member, said formations comprising an endless, part helical, part diverging single turn furrow on one of said members and a helical, multi-turn groove on the other of said members; a plurality of bearing elements in the channel formed by the single turn groove and coinciding portion of the multi-turn groove, providing the only means mechanically connecting the two members; and means provided at the sides of the single turn furrow, said means being shaped to enter and provide a barrier movable through the multi-turn groove, whereby the bearing elements are shunted from the helical channel and directed through the diverging portion of the single turn furrow and prevented from wedging into portions of the multi-turn groove.

2. A load moving device comprising in combination, two members, rotatable and longitudinally movable relatively to each other, one member surrounding the other; means secured to one of said members and preventing its rotation; means for rotating the other member; cooperating formations on both of said members for enabling rotation of the rotatable member to cause the other member to move longitudinally on the rotated member, said formations comprising an endless, part helical, part diverging single turn furrow on one of said members and a continuous, multi-turn helical groove on the other of said members; a plurality of ball bearings in the channel formed by the single turn furrow and the coinciding portion of the continuous, multi-turn groove, said ball bearings being the only means mechanically connecting the two members; and a hump provided at each side of the single turn furrow, said hump being shaped and positioned as to project into and move through the multi-turn groove as said members are relatively rotated, providing a dam by means of which the ball bearings are confined in the single turn furrow and prevented from wedging into adjacent portions of the multi-turn groove.

3. A load moving device comprising in combination, two members, rotatable and longitudinally movable relatively to each other, one member surrounding the other; means secured to one of said members and preventing its rotation; means for rotating the other member; cooperating formations on both of said members for enabling rotation of the rotatable member to cause the other member to move longitudinally on the rotated member, said formations comprising an endless, part helical, part diverging single turn furrow on one of said members and a continuous, multi-turn helical groove on the other of said members; a plurality of ball bearings in the channel formed by the single turn furrow and the coinciding portion of the continuous, multi-turn groove, providing the sole means mechanically connecting the two members; and projections on the member having the single turn, part helical furrow, said projections conforming to the contour of the continuous, multi-turn, helical groove in the other member so as to provide a barrier movable through said multi-turn groove as the members are relatively rotated, whereby the ball bearings are confined to the single turn furrow and prevented from jamming into adjacent portions of the multi-turn groove.

4. A load moving device comprising in combination, two telescopically arranged members capable of relative rotational and longitudinal movement; means for rotating the one member; means for securing the load to the other member; cooperating formations on both members enabling turning of the one member to cause the load supporting member to move longitudinally relatively thereto, said formations comprising a multi-turn helical groove in one of said members and a single turn furrow in the other member, said single turn furrow having a helical portion of a depth similar to the depth of the multi-turn groove and a connecting angular portion at least one and one half times as deep as said multi-turn groove; ball bearings substantially filling the single turn furrow and extending into the coinciding portion of the multi-turn groove mechanically to connect said members; and humps extending from the member having the single-turn furrow one on each side of its angular portion, said humps being formed and located to provide a barrier movable through the multi-turn groove as the members are relatively rotated whereby the ball bearings are confined to the single turn furrow and kept from wedging into adjacent portions of the multi-turn groove.

5. A load moving device comprising in combination, two telescopically arranged members capable of relative rotational and longitudinal movement; means for rotating the one member; means for securing the load to the other member; cooperating formations on both members enabling turning of the one member to cause the load supporting member to move longitudinally relatively thereto, said formations comprising a multi-turn helical groove on both members, one member having a longitudinal slot forming a gap in its grooved surface; a plate inserted in said slot, said plate providing at least one ogee profiled furrow of at least one and one half the depth of the helical grooved portion, said ogee furrow connecting the severed ends of a helical groove to form a continuous, single-turn groove having a helical portion and an ogee profiled portion; balls in the single turn groove extending into the coinciding helical groove portion of the cooperating member mechanically to connect said two members; and humps extending from the insert on the one member at each side of the ogee profiled portion of the furrow, said humps being shaped to enter and pass through the multi-turn groove whereby the balls are confined to the single turn groove and kept from wedging into adjacent portions of the multi-turn groove as said members are rotated and move one relatively to the other.

6. A load moving device comprising in combination, two members rotatable and longitudinally movable relatively to each other, one member surrounding the other; means for rotating one of said members; means for attaching the load to the other of said members; cooperating formations on both members for enabling rotation of the rotatable member to cause the other member to move longitudinally relatively to the rotated member, said formations comprising a continuous multi-turn helical groove in the one member and a single turn furrow, the greater portion of which is of helical profile connected by a reverse pitch furrow forming a closed path in the other of said members, said reverse pitch furrow portion being at least one and one half times the depth of the helical portion of the single turn furrow, said helical portion coinciding in pitch and depth to the pitch and depth of the multi-turn groove in the cooperating member; ball bearings substantially filling the single turn groove and extending into the coinciding portion of the cooperating member for mechanically connecting said members; and deflector extensions on the member having the single turn furrow, said extensions being on each side of the reverse pitch portion of the furrow and being shaped and positioned to enter and pass through the multi-turn groove of the cooperating member, whereby the ball bearings are guided and confined in the single turn furrow and prevented from jamming into adjacent portions of the multi-turn groove.

7. A load moving device comprising in combination, a prime mover; a tubular member driven by the primer mover and having an internal, helical groove substantially throughout its entire length; a plug slidable longitudinally in said tubular member and having a shaft portion attachable to the load, the plug having a longitudinal slot and a helical groove each convolution of which is interrupted by the longitudinal slot, the helical groove of the plug being of a similar pitch and size as the groove of the tubular member; an insert secured in the longitudinal slot, said insert having transverse furrows spaced equally but of a pitch reverse to the helical groove in the plug and deeper than said helical groove, whereby the ends of each helical turn in the plug are connected by a furrow in the insert, thereby providing the plug with a plurality of closed circuit, single turn grooves each comprising a helical portion and a connecting reverse pitch portion; and balls in each single turn groove of the plug, extending into the coinciding portions of the helical grooves in the tubular member for mechanically connecting said member with the plug and causing longitudinal movement of the plug on the rotating tubular member while the balls are confined to their respective single turn grooves in the plug.

8. In combination with a tubular member having a multi-turn groove in its inner peripheral surface; of means for rotating said member; a non-rotatable shaft extending into said member, said shaft having a portion thereof provided with a helical peripheral groove coinciding with the groove of the tubular member to form a helical channel; a longitudinal slot in the grooved surface of the shaft interrupting the continuity of the helical groove therein; an insert secured in the slot of the shaft, having an angular furrow of a pitch reverse but equal to the pitch of the helical groove, for connecting the severed ends of the single turn helical groove in the shaft, whereby a continuous, closed path is formed about the shaft, said path being part helical and the remaining portion angular and of reverse pitch, said angular portion being of a depth at least one and one half times the depth of the helical portion; bearing elements in the closed path groove of the shaft, extending into the coinciding groove of the tubular member for connecting the shaft to said member; and extensions on the insert, one at each side of its furrow, shaped to enter and provide a dam movable through the groove of the tubular member, for confining the bearing elements to the shaft groove and preventing their wedging into adjacent portions of the groove in the tubular member.

9. In combination with a tubular member having a multi-turn groove in its inner peripheral surface; of means for rotating said member; a non-rotatable shaft extending into said member, said shaft having a portion thereof provided with a multi-turn helical groove coinciding with the groove of the tubular member to form a helical channel; a longitudinal slot in the grooved surface of the shaft interrupting the continuity of all of the turns of the helical groove therein; an insert secured in said slot, said insert having a plurality of angular open furrows, of a pitch reverse to the pitch of the helical groove in the shaft, said angular furrows connecting the severed ends of any desired single turn of a helical groove about the shaft, whereby continuous, single turn, closed path grooves are provided about the shaft, each comprising a helical portion and a reverse pitch angular portion, said angular portion being at least one and one half the depth of the helical portion; ball bearings in the single turn grooves of the shaft, extending into the coinciding portion of the groove of the tubular member to connect it to the shaft; and dome like extensions on the insert at each side of the angular reverse pitch portion of a furrow therein, shaped to conform with the multi-turn groove and positioned on the insert relatively to the tubular member to extend into and move through the multi-turn groove in the tubular member for confining the ball bearings to the single turn grooves in the shaft and preventing their jamming into the adjacent portions of the grooves of the tubular member.

10. In combination with a tubular member having a helical groove substantially throughout the entire length of its inner peripheral surface; of means for rotating said member; a plug slidably fitting into said tubular member, said plug having a helical groove in its peripheral surface cooperating with the helical groove in the tubular member to form a helical channel between the plug and member; a shaft secured to the plug to render it non-rotatable; a longitudinal slot in the outer surface of the plug, severing the helical turns of the groove therein; a plate secured in said slot, said plate having ogee furrows of a pitch reverse but equal to the pitch of the helical groove, each ogee furrow connecting the severed ends of a single turn of the helical groove whereby a closed, single turn is provided by each ogee furrow, said ogee furrow being at least one and one half times the depth of the helical groove portion; balls in each single turn groove and extending into the coinciding portion of the helical groove of the tubular member, mechanically to connect it to the plug; and rounded extensions on the plate at each side of an ogee furrow therein, each extension being positioned to enter and form a moving dam in the helical groove of the tubular member whereby the balls are confined to and guided through the single turn groove of the plug and prevented from jamming into the adjacent helical turns of the tubular member.

11. In combination with a tubular member; of a shaft member extending into said tubular member; means for rotating one of said members; means for holding the other member against rotation; a helical groove in the inside and outside peripheral surfaces of the tubular and shaft members respectively, said grooves being of similar pitch and depth and cooperating to form a channel substantially circular in cross section, the groove in the one member extending substantially throughout its entire length, the groove in the other member comprising a substantially lesser number of turns than the groove in the first mentioned member; a longitudinal slot in the member having the lesser turns; said slot interrupting the continuity of said groove turns and thereby rendering adjacent turns disconnected; a plate secured in said slot, said plate having furrows with open ends and top and of similar but reverse pitch and deeper than the helical grooves for connecting the severed ends of each incomplete turn in the member, whereby said turns are completed, each to form a closed path comprising a helical portion and a reverse pitch connecting portion; and balls in each closed path groove extending into coinciding groove portions of the cooperating member to secure the tubular and shaft members together mechanically to enable rotation of one to cause the other to move longitudinally relatively thereto.

12. The method of providing a single turn, continuous groove in a member, said groove comprising a helically contoured portion and a connecting portion having a pitch reverse to the helical portion which comprises, forming a helical groove of at least one complete turn in the peripheral surface of a member, then forming a longitudinal slot in said surface, said slot intersecting the helical groove, then placing an insert in said slot, which insert has a similar groove of opposite pitch to the helical groove, which oppositely pitched groove connects the ends of said helical groove formed by the slot, thereby forming a continuous, closed circuit groove.

13. The method of producing an insert for a helically grooved and longitudinally channelled shaft to provide single turn grooves therein, which consists in arcuating one side of a rectangularly shaped member, then forming transverse grooves in said arcuated side, following the contour thereof and equally spaced at a predetermined pitch and also treating each rib between adjacent grooves so that each rib will have a substantially semi-circular cross section, then forming grooves transversely of the member, of a pitch reverse to the pitch of the ribs, each reverse pitch groove starting at and eliminating the end portion of a rib at one side of the member and terminating at and eliminating the opposite end portion of the adjacent rib, thereby leaving only a substantially thin portion of the rib at each side of a reverse pitch groove and throughout the medial portion of the member.

GEORGE W. JACKSON.

REFERENCES CITED

The following references are of record in the file of this patent:

UNITED STATES PATENTS

| Number | Name | Date |
| --- | --- | --- |
| 793,958 | Richardson | July 4, 1905 |
| 1,406,110 | Troutner | Feb. 7, 1922 |
| 2,322,000 | Douglas | June 15, 1943 |
| 2,398,841 | Morris | Apr. 23, 1946 |
| 2,403,092 | Lear | July 2, 1946 |

FOREIGN PATENTS

| Number | Country | Date |
| --- | --- | --- |
| 30,214 | Great Britain | Dec. 24, 1909 |
| 526,735 | Great Britain | Sept. 24, 1940 |